United States Patent
Yeoh et al.

(10) Patent No.: US 7,211,786 B1
(45) Date of Patent: May 1, 2007

(54) REFLECTIVE LINEAR ENCODER HAVING CONTROLLED DETECTOR TO CODE STRIP DISTANCE

(75) Inventors: Theng Hooi Yeoh, Penang (MY); Ewe Aik Oo, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/378,007

(22) Filed: Mar. 16, 2006

(51) Int. Cl.
*G02D 5/34* (2006.01)
(52) U.S. Cl. .............................. 250/231.13; 250/237 G
(58) Field of Classification Search ................................
250/231.1–231.19, 237 G
See application file for complete search history.

(56) References Cited

U.S. PATENT DOCUMENTS 4,340,814 A * 7/1982 DiCiaccio et al. ..... 250/231.14
4,737,635 A * 4/1988 Uchida ................... 250/231.16
5,148,020 A * 9/1992 Machida ................. 250/231.16

* cited by examiner

*Primary Examiner*—John R. Lee

(57) ABSTRACT

An encoder having a code strip, a light emitter, a photodetector, and a spacing member is disclosed. The code strip includes an encoding region having a plurality of reflective and absorptive regions on a carrier having an encoding surface. The light emitter generates a light signal that is reflected from one of the reflective regions. The reflected light is measured by the photodetector. The spacing member maintains a fixed distance between the encoding surface and the photodetector when the code strip moves relative to the photodetector in a travel direction. The spacing member is attached to the photodetector and moves relative to the code strip when the code strip moves relative to the photodetector. A mechanism for allowing one of the photodetector and the code strip to move in a direction perpendicular to the travel direction to accommodate alignment errors can also be included.

10 Claims, 5 Drawing Sheets

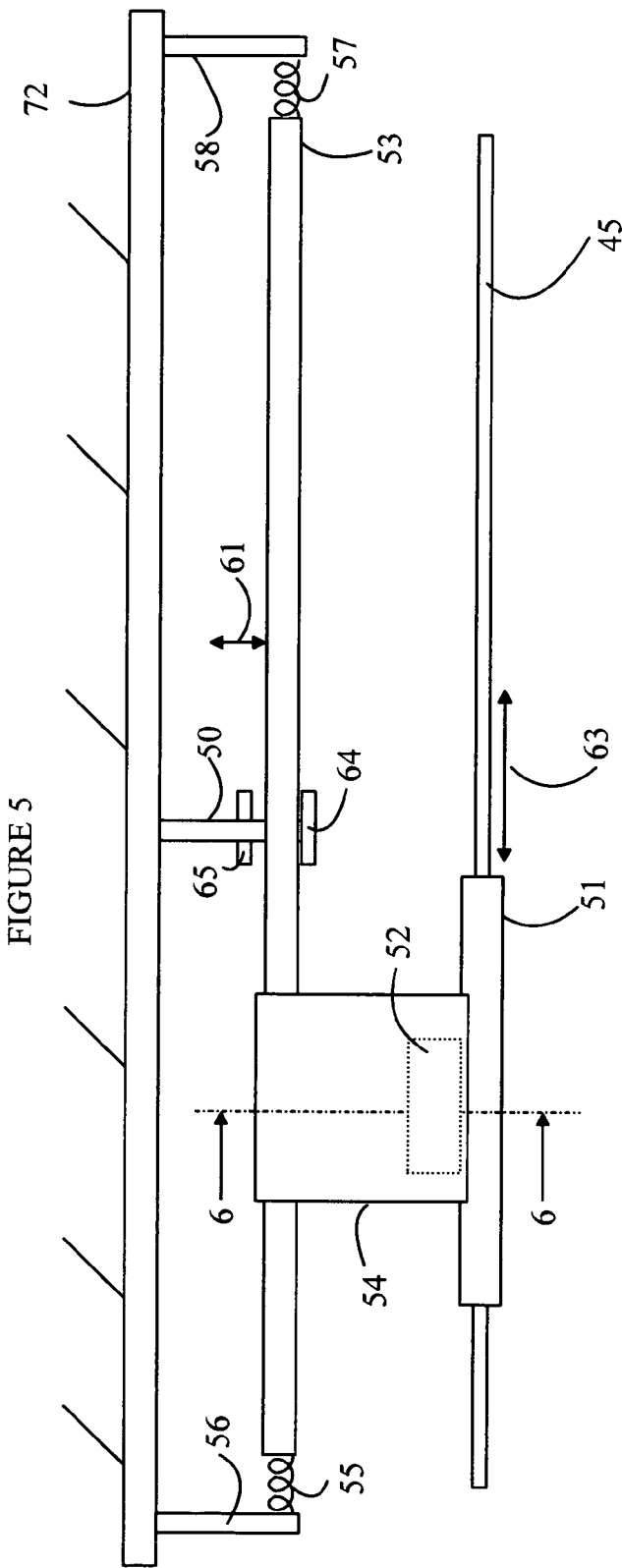
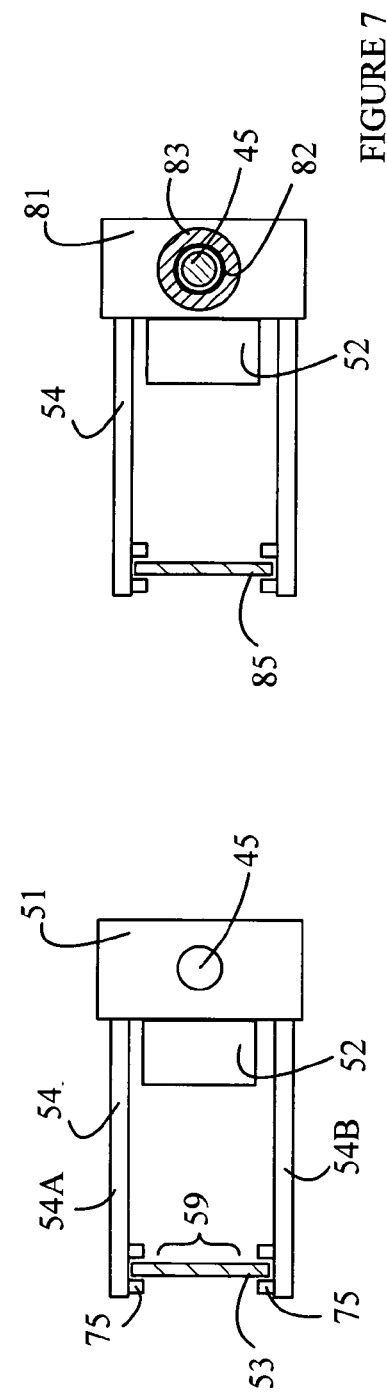

REFLECTIVE LINEAR ENCODER HAVING CONTROLLED DETECTOR TO CODE STRIP DISTANCE

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

Optical encoders utilize a light source and a photodetector to measure changes in the relative position of an encoding disk or strip. In a transmissive encoder, the encoding strip includes a series of alternating opaque and transparent bands. The light source is located on one side of the encoding strip, and the photodetector is located on the other side of the encoding disk. The light source and the photodetector are fixed relative to one another, and the encoding strip moves between the light source and the photodetector such that the light reaching the photodetector is interrupted by the opaque regions of the encoding strip. The position of the encoding strip is determined by measuring the transitions between the light and dark regions observed by the photodetector.

In a reflective encoder, the light source and photodetector are located on the same side of the encoding strip, and the encoding pattern consists of alternating reflective and absorbing bands. The light source is positioned such that light from the light source is reflected onto the photodetector when the light is reflected from the reflective bands.

Transmissive encoders have a number of advantages over reflective encoders in terms of tolerance. In a transmissive encoder, the light from the light source is collimated before it reaches the encoding strip, and hence, the light leaving the encoding strip is also collimated. The detection assembly needs only to image this collimated light onto the detector surface. Hence, the only critical distance is that between the imaging lens and the detector. This distance remains constant even if the distance between the code strip and the detector varies during the relative movement of the code strip and the detector.

In a reflective encoder, the distance between the code strip and the detector is critical as either the encoding strip itself or the light source as seen in the reflected light from the encoding strip is imaged into the detector. Hence, if there is an error in the code strip to detector module distance, the image will be out of focus and errors will result.

Unfortunately, transmissive encoders require that the two separate components, the light source and photodetector, be mounted and aligned with one another at the time of assembly of the encoder. This increases the burden on the manufacturer of the final product that incorporates the encoder. Reflective encoders, in contrast, are constructed from a single emitter-detector element that is packaged together with the various optical components for imaging the light source onto the photodetector. Hence, the manufacturer only has to mount and align one component. This reduces the cost of assembly from the manufacturer's point of view. In addition, in many applications involving miniature motors and the like, providing mounting locations on both sides of the code strip poses problems. Hence, if the problems associated with maintaining the correct distance between the code strip and the emitter detector module could be overcome, reflective encoders would be preferred.

SUMMARY OF THE INVENTION

The present invention includes an encoder having a code strip, a light emitter, a photodetector, and a spacing member. The code strip includes an encoding region having a plurality of reflective and absorptive regions on a carrier having an encoding surface. The light emitter generates a light signal that is reflected from one of the reflective regions. The reflected light is measured by the photodetector. The spacing member maintains a fixed distance between the encoding surface and the photodetector when the code strip moves relative to the photodetector in a travel direction. The spacing member is attached to the photodetector and moves relative to the code strip when the code strip moves relative to the photodetector. In one aspect of the invention, the encoder further includes a mechanism for allowing one of the photodetector and the code strip to move in a direction perpendicular to the travel direction to accommodate alignment errors.

BRIEF DESCRIPTION OF THE DRAWINGS

FIG. 5 is a top view of a portion of a fixed apparatus.

FIG. 6 is a cross-sectional view through line 6—6 shown in FIG. 5.

FIG. 7 is a cross-sectional view of a head 81.

DETAILED DESCRIPTION OF THE PREFERRED EMBODIMENTS OF THE INVENTION

Figure 3:
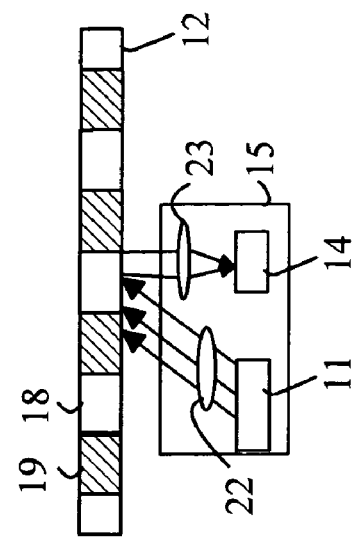
FIG. 3 illustrates another form of reflective encoder.
Figure 2:
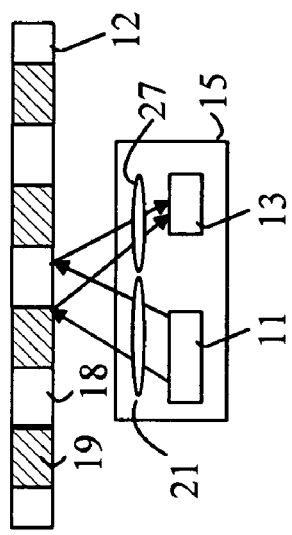
FIG. 2 illustrates one type of reflective encoder.
Figure 1:
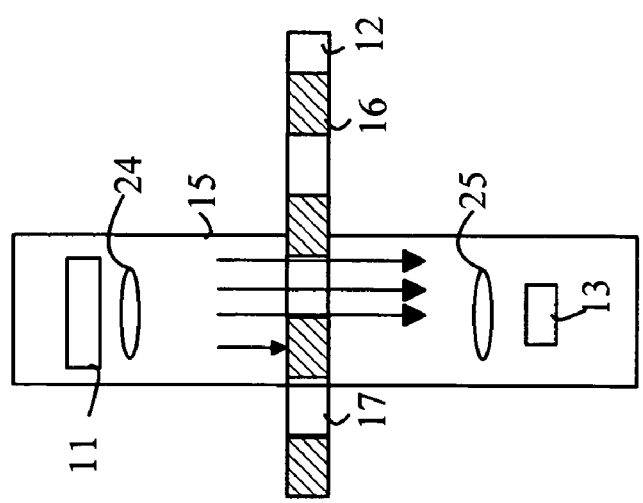
FIG. 1 illustrates a transmissive encoder.

The manner in which the present invention provides its advantages can be more easily understood with reference to FIGS. 1–3, which illustrate some typical encoder designs. The encoder can be divided into an emitter/detector module 15 and a code wheel or code strip. Module 15 includes an emitter 11 that illuminates a portion of the code strip 12. The illuminated code strip is viewed by detector 13. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as lens 24. Code strip 12 includes opaque stripes 16 and transparent stripes 17. When code strip 12 moves between emitter 11 and detector 13, the light beam is interrupted by the opaque stripes on the code strip. The photodiodes in the detector receive flashes of light. The resultant signal is then used to generate a logic signal that transitions between logical one and logical zero.

The detector can include an imaging lens 25 that images the collimated light onto the photodiode. Lens 25 can be used to adjust the size of the light stripes to match the size of the photodiode or photodiodes in the detector. When used in this manner, the photodetector is placed at a point between the code strip and the focal point of lens 25. The distance between the photodetector and the lens determines the size of the code strip image on the photodetector.

In general, the collimator is constructed from two separate sub-modules that are provided to the manufacturer of the completed encoder. The first sub-module includes the light source consisting of emitter 11 and lens 24. The second sub-module consists of photodetector 13 and lens 25. Since the light is collimated, the only critical distances are those between emitter 11 and lens 24 and between lens 25 and photodetector 13. These distances can be controlled to a high level of precision by the sub-module manufacturer. Hence, the tolerances that need to be maintained by the encoder manufacturer are substantially reduced in transmissive designs.

Furthermore, this type of collimated design is insensitive to the distance between code strip 12 and lens 25. Hence, if the code strip moves relative to lens 25 during its motion, the code strip image will still remain in focus on detector 13.

FIG. 2 illustrates one type of reflective encoder. In reflective encoders, the code strip includes reflective stripes 18 and absorptive stripes 19. The emitter includes an optical system such as a lens 21 that images the emitter light source into the detector when the light strikes a reflective stripe on the code strip. The light from the emitter is reflected or absorbed by the stripes on the code strip. The output from the photodetector is again converted to a logic signal. In embodiment in which the photodetector includes a plurality of photodiodes that provide a signal that depends on matching an image of the strips to the photodiodes, a second lens 27 can be included to adjust the size of the code strip image to the size of the photodetectors in a manner analogous to that described above.

FIG. 3 illustrates another form of a reflective encoder that will be referred to as an imaging encoder in the following discussion. An imaging encoder operates essentially the same as the reflective encoder described above, except that module 15 includes imaging optics 23 that form an image of the illuminated code strip on the detector 14. In addition, the light source is processed by lens 22 such that the code strip is uniformly illuminated in the region imaged onto the detector.

In both of the types of reflective encoders discussed above, the distance between the code strip and module 15 is critical. While the manufacturer of module 15 can maintain the distances between the lens and emitter and detectors at the required precision within the module, the encoder manufacturer must control the distance between module 15 and code strip 12. Hence, reflective encoder designs require more expertise and are more expensive from the standpoint of the encoder manufacturer.

Figure 4:
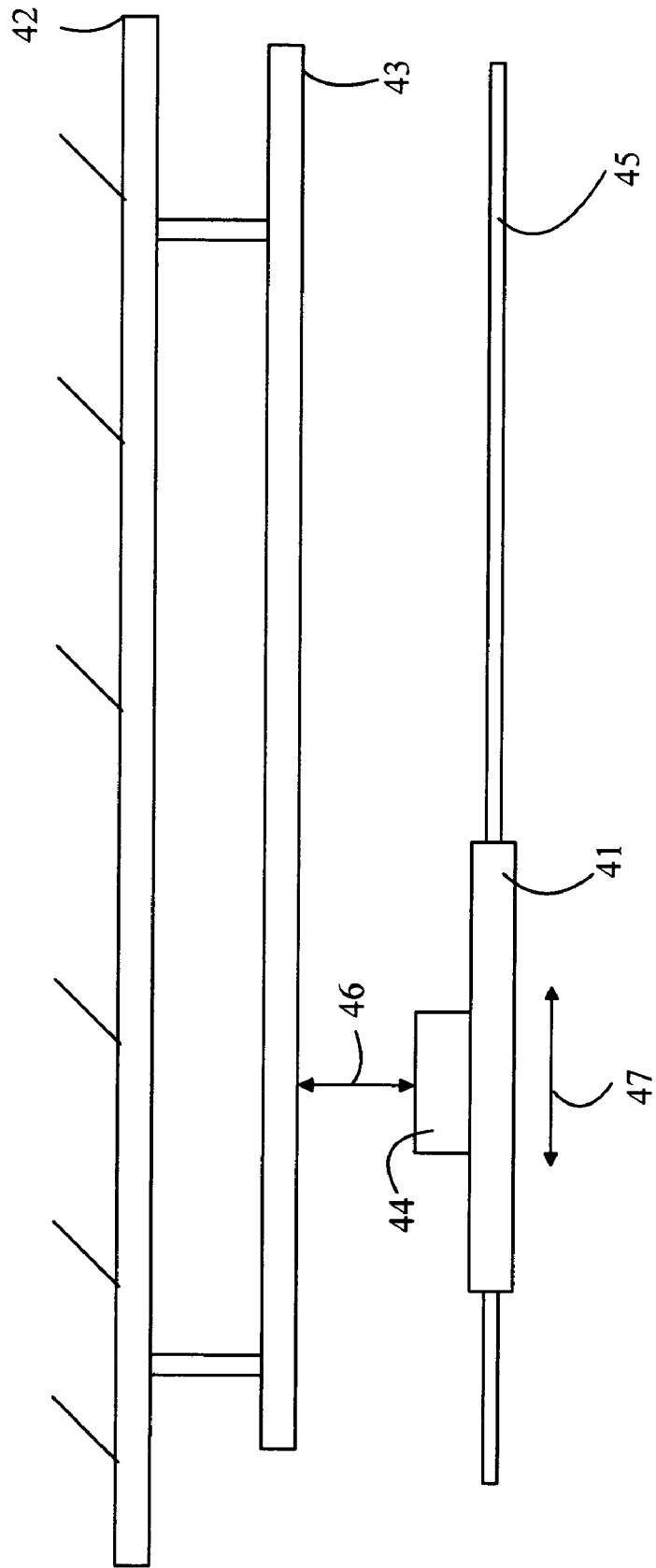
FIG. 4 illustrates a typical linear encoder arrangement for measuring the position of a print head with respect to a fixed apparatus.

In addition, any fluctuations in the distance between code strip 12 and the emitter detector module during the motion of code strip 12 relative to the emitter detector module will result in the image of the code strip on the detector being out of focus for part of the time. Refer now to FIG. 4, which illustrates a typical linear encoder arrangement for measuring the position of a print head 41 with respect to a fixed apparatus 42. A code strip 43 is affixed to apparatus 42. Print head 41 includes a emitter detector module 44. Print head 41 moves relative to code strip 43 in the direction shown at 47 along a shaft 45 that is fixed relative to apparatus 42. As noted above, the distance 46 between code strip 43 and emitter detector module 44 must remain constant as print head 41 moves along shaft 45; hence, shaft 45 must be mounted such that it is parallel to code strip 43. Maintaining this parallel arrangement to the accuracy necessary for the encoder to function properly increases the costs of the system, particularly in systems requiring high accuracy in the position measurements.

Refer now to FIGS. 5 and 6, which illustrate an apparatus that includes a linear encoder according to one embodiment of the present invention. FIG. 5 is a top view of a portion of the apparatus, and FIG. 6 is a cross-sectional view through line 6—6 shown in FIG. 5. The apparatus includes a head 51 that moves on a shaft 45 relative to a base 72, which is stationary. The apparatus includes a linear encoder that includes emitter detector module 52 and code strip 53. Emitter detector module 52 is attached to head 51 and moves with head 51 in the direction shown at 63. The distance between head 51 and code strip 53 is fixed by spacer 54. Spacer 54 will be discussed in more detail below. For the purposes of the present discussion, it is sufficient to note that spacer 54 maintains a fixed distance between code strip 53 and emitter detector module 52.

Since code strip 53 and head 51 are confined by spacer 54 to maintain a fixed distance with respect to one another, the present invention provides a mechanism for allowing the code strip to move relative to base 72 to accommodate any alignment errors between shaft 45 and base 72. This mechanism must allow code strip 53 to move back and forth in the direction shown at 61 but not allow motion in direction 63. In the embodiment shown in FIG. 5, this is accomplished by utilizing a restrainer 50 that passes through code strip 53 and attaches to base 72, to limit any movement to movement in direction 61. The restrainer includes stops 64 and 65 that define the amount of motion allowed in direction 61. Code strip 53 is also attached to two additional ridged supports shown at 56 and 58 by spring mechanisms 55 and 57. The spring mechanism together with pin 50 allow the code strip to move in direction 61 to accommodate any alignment errors with respect to shaft 45.

Refer now to FIG. 6. Spacer 54 includes two ridged members 54A and 54B that set the distance between head 51 and code strip 53. Code strip 53 has a central region 59 that includes the reflective and absorptive bands used to measure the position of head 51 relative to code strip 53. One end of each member is attached to head 51 and the other engages code strip 53. The ridged members include slots 75 that engage the edges of code strip 53 in the regions not used for the encoding pattern. Hence, any wear or other damage caused by the motion of the slots over code strip 53 will be limited to regions not used for position measurements, and hence, will not interfere with the position measurements. Likewise, restrainer 50 passes through a mating feature in code strip 53 in a region that is outside region 59.

The above-described embodiments utilize a mechanism for providing compliant mounting of the code strip. However, the compliant mounting could be incorporated in the head. Refer now to FIG. 7, which is a cross-sectional view of a head 81 that includes a compliant mount for allowing the head to move relative to the code strip in a direction perpendicular to the direction of travel. Head 81 moves on a shaft 45 in a manner analogous to that described above with reference to FIGS. 5 and 6. Head 81 includes a bushing 82 that slides over shaft 45. Bushing 82 is surrounded by a compliant ring of material that fills the gap between the hole in head 81 and bushing 82. This ring of compliant material allows the head to move relative to the code strip while maintaining a constant distance between emitter detector module 52 and the code strip 85.

Figure 8:
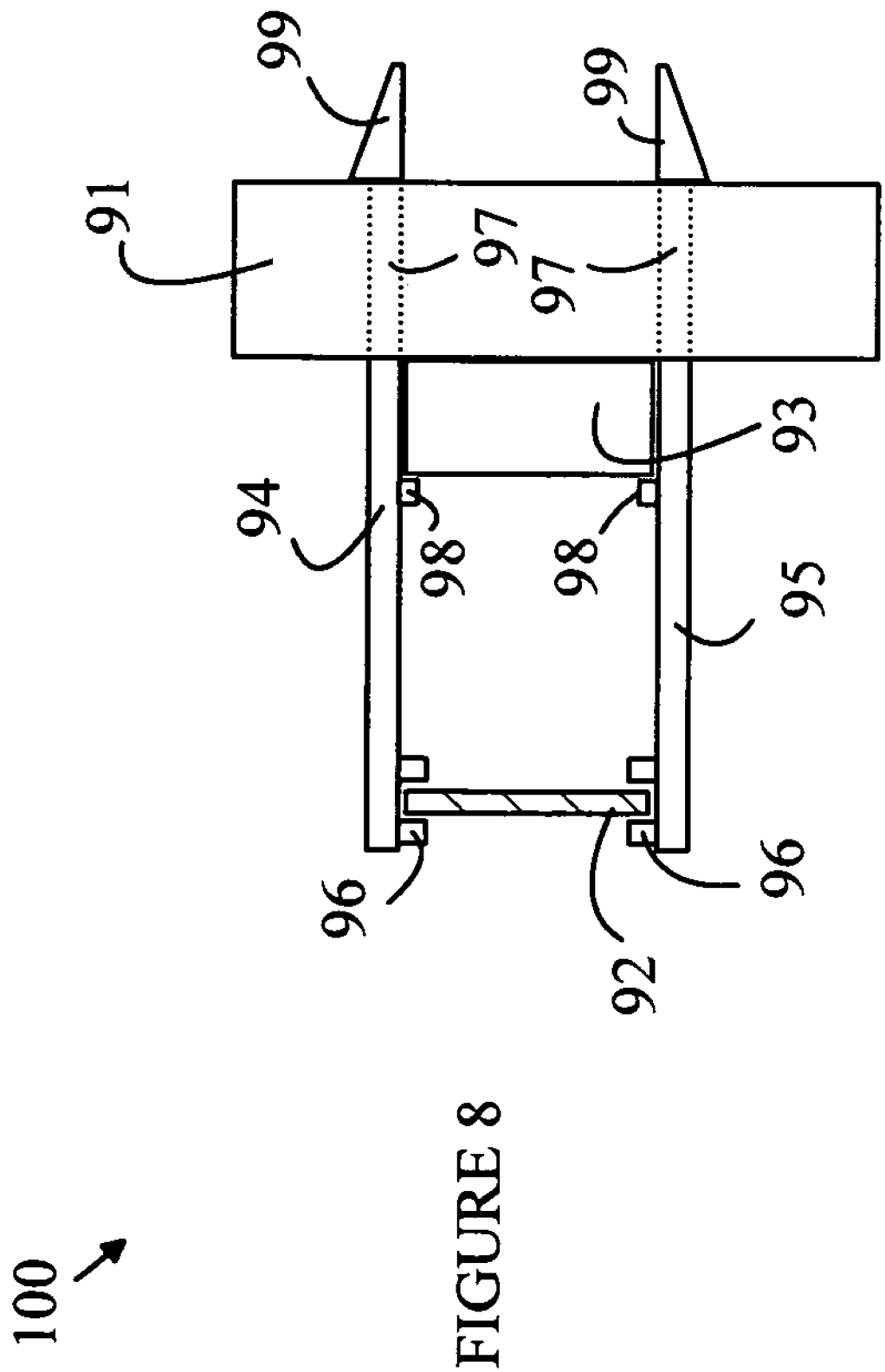
FIG. 8 is a cross-sectional view of an encoder 100 according to another embodiment of the present invention.

The above-described embodiments utilize a spacing member that is part of the head or other substrate to which the emitter detector module is attached. If the spacing member is permanently attached to the substrate prior to mounting the assembly with the emitter detector module in the system, then the spacing member must be sufficiently pliable to allow the slots to be placed over the code strip. Alternatively, the slot feature on the spacing member can be inserted into the code strip through the code strip ends prior to code strip fixation. Refer now to FIG. 8, which is a cross-sectional view of an encoder 100 according to another embodiment of the present invention. Encoder 100 includes an emitter detector module 93 that views a code strip 92. Emitter detector module 93 is mounted on a substrate 91 that moves relative to code strip 92. A spacing member consisting of members 94 and 95 sets the distance between emitter detector module 93 and code strip 92. Each of members 94 and 95 includes a slot 96 for engaging the code strip so that the code strip can move relative to substrate 91. Each member also includes a protrusion for forcing emitter detector module 93 against the surface of substrate 91 so that emitter detector module 92 is properly positioned. Substrate 91 also includes two or more holes 97 that receive latches 99 that fasten members 94 and 95 to substrate 91 when the latches are forced through the holes.

In practice, the encoder is assembled by attaching one of the members, e.g., member 95, to the substrate and positioning the slotted end over the edge of code strip 92. It is assumed that the substrate is already affixed to the portion of the apparatus that is to carry the emitter detector module. Emitter detector module 93 can be inserted between protrusion 98 and substrate 91 after this operation or attached with a temporary adhesive to substrate 91 prior to this operation. The slotted end of the remaining member is then placed over the edge of code strip 92, and the latch end is inserted into the corresponding hole or holes in substrate 91. Hence, the present invention also provides a simple and efficient method for assembling the code strip and emitter detector module in the final apparatus.

Figure 9:
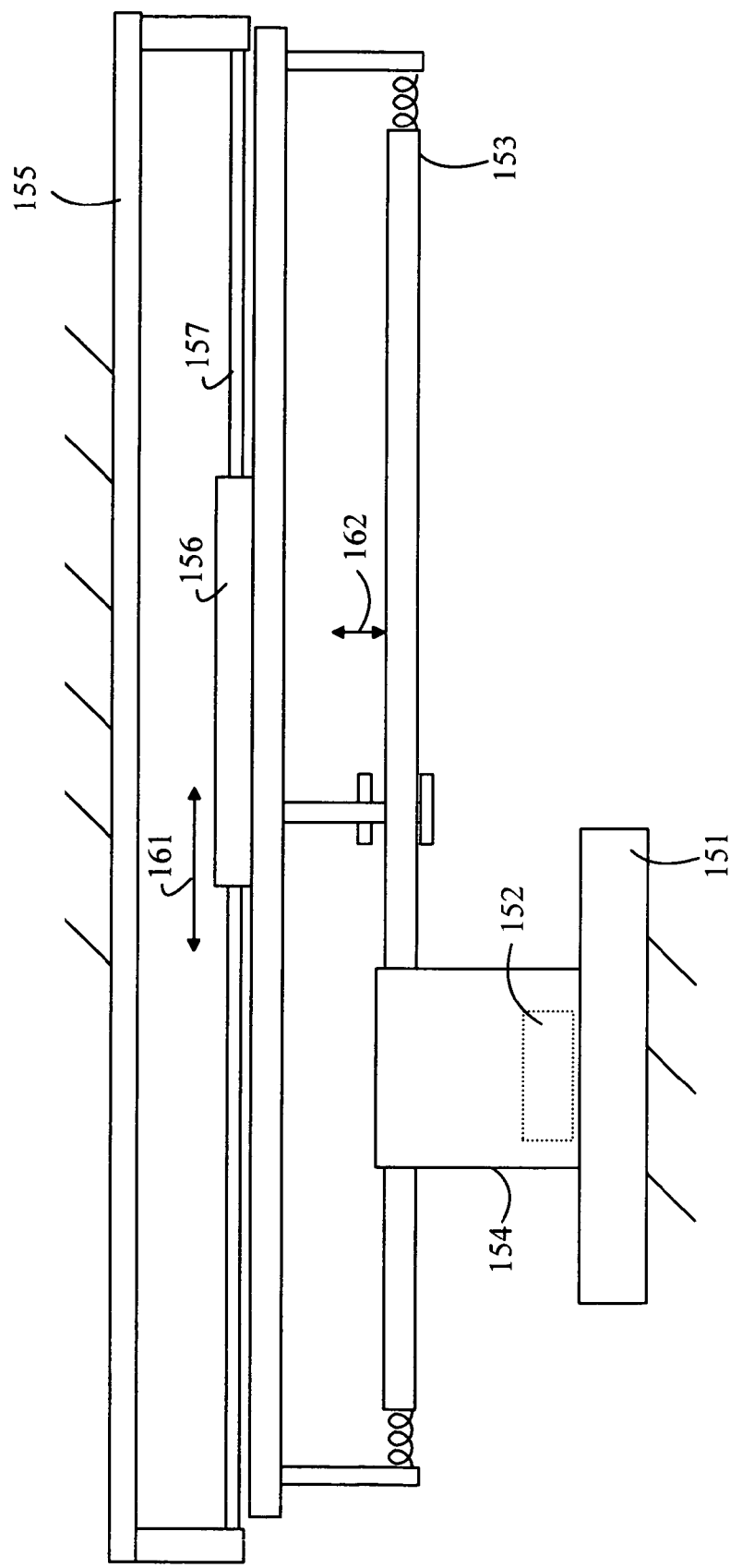
FIG. 9 illustrates another embodiment of an encoder according to the present invention.

The embodiments of the present invention described above utilize an emitter detector module that moves relative to a fixed code strip in a predetermined direction of travel. However, embodiments in which the emitter detector module is fixed relative to a stationary base and the code strip moves on a carriage mechanism past the emitter detector module can also be constructed in a similar manner. Refer now to FIG. 9, which illustrates another embodiment of an encoder according to the present invention. This encoder arrangement has a code strip 153 that moves relative to the fixed base 155 and an emitter detector module 152 that is attached to a substrate 151 that remains stationary with respect to the base. The code strip is mounted on a substrate 156 that moves along a track 157 in the direction shown at 161. The distance between the emitter detector module and the code strip is maintained at a predetermined value by a spacing member 154. In this embodiment, the code strip is mounted such that the code strip can move perpendicular to the direction of travel as shown at 162 to accommodate alignment errors. However, embodiments in which emitter detector module 152 can move in direction 162 can also be constructed in a manner analogous to that described above.

In the above-described embodiments, the emitter detector module and code strip are attached to various substrates. To simplify the drawings, the other components that are involved in the system utilizing the encoder have been omitted. However, it is to be understood that the substrates may contain a wide variety of other components.

In the above-described embodiments, the encoder utilized an emitter detector module to provide the illumination and detection functions. However, embodiments in which the light source and detector are separately mounted can also be constructed. It should also be noted that embodiments in which only the photodetector needs to move relative to the code strip can also be constructed. For example, in an imaging encoder in which the detector forms an image of the code strip pattern on the detector, a single fixed light source could be utilized to illuminate all of the code strip.

Various modifications to the present invention will become apparent to those skilled in the art from the foregoing description and accompanying drawings. Accordingly, the present invention is to be limited solely by the scope of the following claims.

What is claimed is:

1. An encoder comprising:
a code strip comprising an encoding region having a plurality of reflective and absorptive regions on a carrier having an encoding surface;
a light emitter that generates a light signal that is reflected from one of said reflective regions;
a photodetector that measures said reflected light;
a spacing member that maintains a fixed distance between said encoding surface and said photodetector when said code strip moves relative to said photodetector in a travel direction irrespective of movement of said code strip perpendicular to said travel direction, said spacing member being attached to said photodetector and moving relative to said code strip when said code strip moves relative to said photodetector.

2. An encoder comprising:
a code strip comprising an encoding region having a plurality of reflective and absorptive regions on a carrier having an encoding surface;
a light emitter that generates a light signal that is reflected from one of said reflective regions;
a photodetector that measures said reflected light;
a spacing member that maintains a fixed distance between said encoding surface and said photodetector when said code strip moves relative to said photodetector in a travel direction, said spacing member being attached to said photodetector and moving relative to said code strip when said code strip moves relative to said photodetector;
wherein one of said photodetector and said code strip is attached to a fixed base and the other of said photodetector and said code strip moves on a track that is fixed with respect to said base and wherein said encoder further comprises a mechanism for allowing one of said photodetector and said code strip to move in a direction perpendicular to said travel direction to accommodate alignment errors between said track and said fixed base.

3. An encoder comprising:
a code strip comprising an encoding region having a plurality of reflective and absorptive regions on a carrier having an encoding surface;
a light emitter that generates a light signal that is reflected from one of said reflective regions;
a photodetector that measures said reflected light;
a spacing member than maintains a fixed distance between said encoding surface and said photodetector when said code strip moves relative to said photodetector in a travel direction, said spacing member being attached to said photodetector and moving relative to said code strip when said code strip moves relative to said photodetector;

wherein one of said photodetector and said code strip is attached to a fixed base and the other of said photodetector and said code strip moves on a track that is fixed with respect to said base and wherein said encoder further comprises a mechanism for allowing one of said photodetector and said code strip to move in a direction perpendicular to said travel direction to accommodate alignment errors between said track and said fixed base;

wherein said code strip is attached to a fixed base and said photodetector moves on a track relative to said code strip and wherein said mechanism allows said code strip to move relative to said base in said direction perpendicular to said travel direction while preventing said code strip from moving in a direction parallel to said travel direction.

4. An encoder comprising:

a code strip comprising an encoding region having a plurality of reflective and absorptive regions on a carrier having an encoding surface;

a light emitter that generates a light signal that is reflected from one of said reflective regions;

a photodetector that measures said reflected light;

a spacing member that maintains a fixed distance between said encoding surface and said photodetector when said code strip moves relative to said photodetector in a travel direction, said spacing member being attached to said photodetector and moving relative to said code strip when said code strip moves relative to said photodetector;

wherein one of said photodetector and said code strip is attached to a fixed base and the other of said photodetector and said code strip moves on a track that is fixed with respect to said base and wherein said encoder further comprises a mechanism for allowing one of said photodetector and said code strip to move in a direction perpendicular to said travel direction to accommodate alignment errors between said track and said fixed base;

wherein said code strip is attached to a fixed base and said photodetector moves on a track relative to said code strip and wherein said mechanism allows said photodetector to move relative to said base in said direction perpendicular to said travel direction.

5. An encoder comprising:

a code strip comprising an encoding region having a plurality of reflective and absorptive regions on a carrier having an encoding surface;

a light emitter that generates a light signal that is reflected from one of said reflective regions;

a photodetector that measures said reflected light;

a spacing member than maintains a fixed distance between said encoding surface and said photodetector when said code strip moves relative to said photodetector in a travel direction, said spacing member being attached to said photodetector and moving relative to said code strip when said code strip moves relative to said photodetector;

wherein one of said photodetector and said code strip is attached to a fixed base and the other of said photodetector and said code strip moves on a track that is fixed with respect to said base and wherein said encoder further comprises a mechanism for allowing one of said photodetector and said code strip to move in a direction perpendicular to said travel direction to accommodate alignment errors between said track and said fixed base;

wherein said code strip is attached to a moveable substrate that moves on a track relative to said code strip and said photodetector is attached to a substrate that is fixed relative to said track and wherein said mechanism allows said code strip to move relative to said base in said direction perpendicular to said travel direction while preventing said code strip from moving in a direction parallel to said travel direction.

6. An encoder comprising:

a code strip comprising an encoding region having a plurality of reflective and absorptive regions on a carrier having an encoding surface;

a light emitter that generates a light signal that is reflected from one of said reflective regions;

a photodetector that measures said reflected light;

a spacing member than maintains a fixed distance between said encoding surface and said photodetector when said code strip moves relative to said photodetector in a travel direction, said spacing member being attached to said photodetector and moving relative to said code strip when said code strip moves relative to said photodetector;

wherein one of said photodetector and said code strip is attached to a fixed base and the other of said photodetector and said code strip moves on a track that is fixed with respect to said base and wherein said encoder further comprises a mechanism for allowing one of said photodetector and said code strip to move in a direction perpendicular to said travel direction to accommodate alignment errors between said track and said fixed base;

wherein said code strip is attached to a moveable substrate that moves on a track relative to said code strip and said photodetector is attached to a substrate that is fixed relative to said track and wherein said mechanism allows said photodetector to move relative to said base in said direction perpendicular to said travel direction.

7. The encoder of claim 1 wherein said light emitter and said photodetector are encapsulated in a clear medium to form an emitter detector module.

8. An encoder comprising:

a code strip comprising an encoding region having a plurality of reflective and absorptive regions on a carrier having an encoding surface;

a light emitter that generates a light signal that is reflected from one of said reflective regions;

a photodetector that measures said reflected light;

a spacing member that maintains a fixed distance between said encoding surface and said photodetector when said code strip moves relative to said photodetector in a travel direction, said spacing member being attached to said photodetector and moving relative to said code strip when said code strip moves relative to said photodetector;

wherein said spacing member comprises slots that engage said code strip such that said code strip can move in said slots when said photodetector moves relative to said code strip.

9. An encoder comprising:

a code strip comprising an encoding region having a plurality of reflective and absorptive regions on a carrier having an encoding surface;

a light emitter that generates a light signal that is reflected from one of said reflective regions;

a photodetector that measures said reflected light;

a spacing member that maintains a fixed distance between said encoding surface and said photodetector when said code strip moves relative to said photodetector in a travel direction, said spacing member being attached to said photodetector and moving relative to said code strip when said code strip moves relative to said photodetector;

wherein said spacing member comprises slots that engage said code strip such that said code strip can move in said slots when said photodetector moves relative to said code strip;

wherein said slots engage said code strip in a region of said code strip outside of said encoding region.

10. An encoder comprising:

a code strip comprising an encoding region having a plurality of reflective and absorptive regions on a carrier having an encoding surface;

a light emitter that generates a light signal that is reflected from one of said reflective regions;

a photodetector that measures said reflected light;

a spacing member that maintains a fixed distance between said encoding surface and said photodetector when said code strip moves relative to said photodetector in a travel direction, said spacing member being attached to said photodetector and moving relative to said code strip when said code strip moves relative to said photodetector;

wherein said photodetector is mounted on a substrate and wherein said spacing member comprises a mechanical latch that engages said substrate when said latch is inserted in a hole in said substrate, said latch securing said spacing member to said substrate such that said photodetector remains at a fixed distance from said code strip.

* * * * *

UNITED STATES PATENT AND TRADEMARK OFFICE
CERTIFICATE OF CORRECTION

PATENT NO.         : 7,211,786 B1
APPLICATION NO. : 11/378007
DATED              : May 1, 2007
INVENTOR(S)        : Theng Yeoh It is certified that error appears in the above-identified patent and that said Letters Patent is hereby corrected as shown below:

Col. 6 Line 61 In Claim 3, delete "than" and insert -- that --, therefor.

Col. 7 Line 50 In Claim 5, delete "than" and insert -- that --, therefor.

Col. 8 Line 13 (Approx.) In Claim 6, delete "than" and insert -- that --, therefor.

Signed and Sealed this

Seventeenth Day of February, 2009

JOHN DOLL
*Acting Director of the United States Patent and Trademark Office*